United States Patent [19]
Young et al.

[11] Patent Number: 5,211,193
[45] Date of Patent: May 18, 1993

[54] ANNULAR FUEL LINE FITTING

[75] Inventors: Jonathan Young, Vancouver; Gary Steinthorson, Burnaby; Kent Wu; Doug Paul, both of Vancouver, all of Canada

[73] Assignee: Teleflex (Canada) Limited, Richmond, Canada

[21] Appl. No.: 840,192

[22] Filed: Feb. 24, 1992

[51] Int. Cl.⁵ .............................................. B60K 15/01
[52] U.S. Cl. .................................... 137/590; 280/834
[58] Field of Search ........................ 137/590; 73/313; 280/834

[56] References Cited

U.S. PATENT DOCUMENTS

| | | | |
|---|---|---|---|
| 3,173,469 | 5/1965 | Shockey | 137/590 |
| 3,470,907 | 10/1969 | Shockey | 137/590 |
| 3,500,858 | 3/1970 | Metcalf | 137/590 |
| 3,861,418 | 1/1975 | Dujardyn | 137/590 |
| 4,212,318 | 7/1980 | Warmbold | 137/590 |
| 4,305,416 | 12/1981 | Henning et al. | 137/590 X |
| 4,557,144 | 12/1985 | Lucchini | 73/313 |
| 4,651,701 | 3/1987 | Weaver | 137/590 X |
| 4,831,878 | 5/1989 | Hayashi et al. | 73/313 |
| 4,841,771 | 6/1989 | Glover et al. | 73/313 X |
| 4,939,932 | 7/1990 | Ritzenthaler et al. | 73/313 X |

Primary Examiner—John Rivell
Attorney, Agent, or Firm—Norman M. Cameron

[57] ABSTRACT

A fuel tank fitting for withdrawing fuel through a fuel sensor aperture in a fuel tank. The fitting includes an annular member having a plurality of spaced-apart fastener apertures. A fuel line has a first portion extending generally radially through the annular member to its central aperture. The fuel line has a second portion connected to the first portion and extending perpendicularly away from the bottom of the annular member.

10 Claims, 2 Drawing Sheets 5,211,193

ANNULAR FUEL LINE FITTING

BACKGROUND OF THE INVENTION

1. Field of the Invention

This invention relates to fittings for drawing fuel from fuel tanks through apertures provided for fuel level sensors.

2. Description of Related Art

Diesel engine heaters are used to keep diesel engines warm when they are turned off to facilitate restarting. Such heaters reduce the need to keep vehicle engines running, particularly during cold weather, thus reducing polluting emissions from idling engines and the accompanying noise pollution.

Diesel engine heaters of this type conventionally burn diesel engine fuel obtained from the fuel tank of the vehicle. Often this means drilling a special hole in the fuel tank to receive a special fitting so the fuel line from the heater can be inserted into the tank. This is often undesirable, particularly if the diesel engine heaters are to be installed as original equipment. Manufacturers of vehicles are hesitant to drill additional holes in fuel tanks because this lessens the structural integrity of the tank itself and possibility increases the risk of tank failure and consequent legal liability. In addition, drilling additional holes in tanks is prohibited for certain vehicles such as buses in some jurisdictions.

Consequently, there is a need to provide means for installing fuel lines for diesel engine heaters without requiring additional apertures to be drilled in the fuel tanks. One possibility is utilizing the apertures already in place for fuel level sensors for most vehicles. Devices for removing fuel via fuel level measuring devices have been developed in the past. An example is found in U.S. Pat. No. 4,939,932 to Ritzonthaler where fuel can be removed through a suction tube. A special level measuring device is required though to remove fuel from the tank.

In U.S. Pat. No. 4,557,144 to Lucchini, a level sensor for motor vehicle tanks includes a fuel withdrawal line which passes through a special flange. Like the previous patent, this device is not well adapted for retrofitting existing tanks while utilizing existing, standard fuel level measuring devices.

SUMMARY OF THE INVENTION

It is an object of this invention to provide an improved fitting for fuel tanks of diesel engined vehicles which allows fuel to be drawn from the tanks through existing apertures for fuel level sensors, while utilizing standard, pre-existing fuel level measuring devices.

It is another object of the invention to provide a fuel line fitting for a fuel level sensor aperture in a fuel tank which does not interfere with normal operation of the fuel level sensor.

It is a further object of the invention to provide a fuel line fitting for a fuel level sensor aperture in a fuel tank which can be easily and quickly installed.

In accordance with these objects, the invention provides a fuel tank fitting for withdrawing fuel through a fuel sensor aperture in a fuel tank. The fitting includes an annular member having a top, a bottom, a central aperture and a plurality of fastener apertures spaced-apart circumferentially thereabout and extending from the top to the bottom thereof. A fuel line has a first portion extending generally radially through the annular member to the central aperture thereof and a second portion connected to the first portion and extending perpendicularly away from the bottom of the annular member.

DESCRIPTION OF THE PREFERRED EMBODIMENTS

Figure 1:
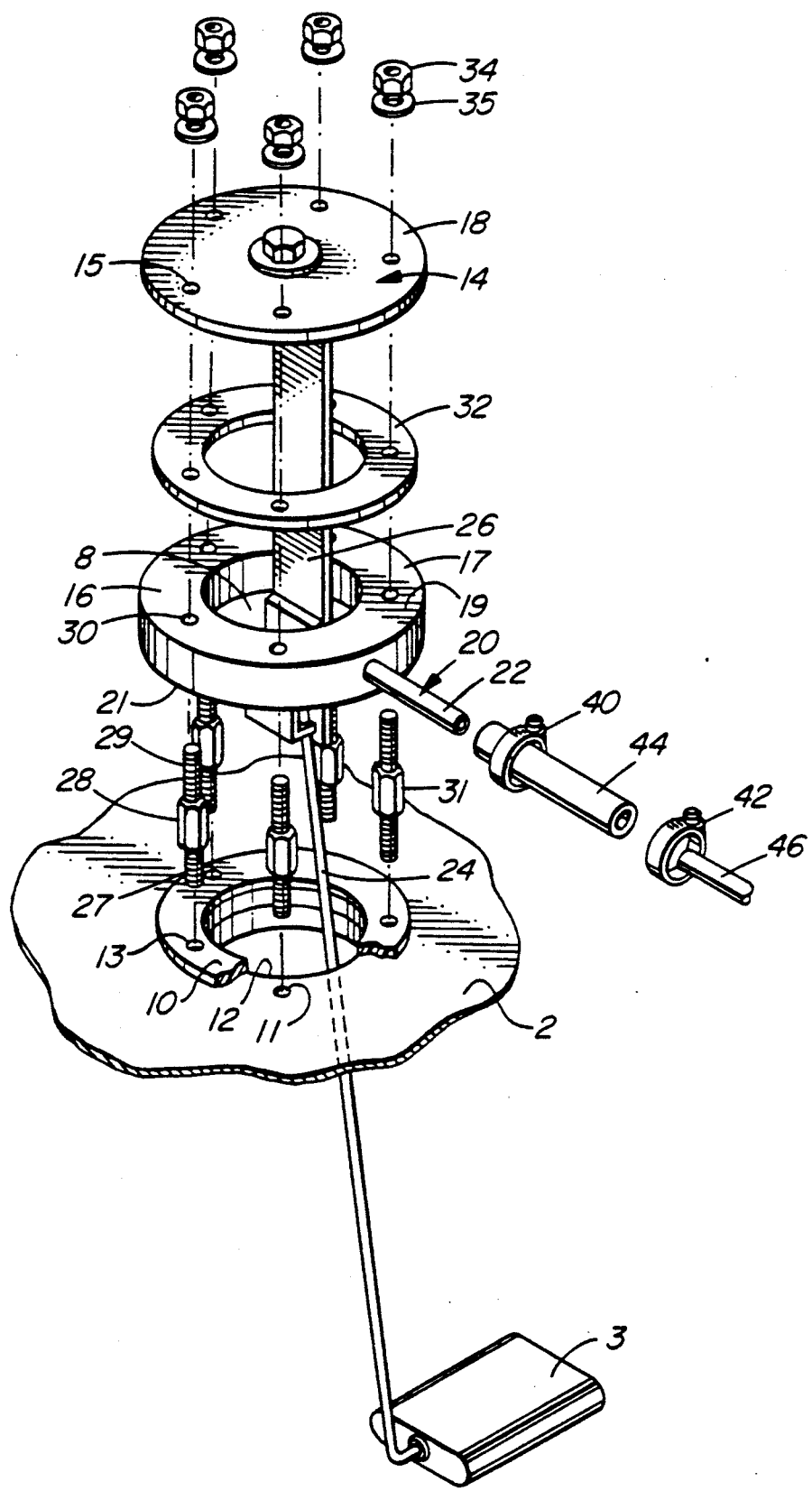
FIG. 1 is an exploded, isometric view of a fuel tank assembly according to an embodiment of the invention.

Referring to FIG. 1, this shows in fragment a fuel tank 2 of a vehicle equipped with a diesel engine (not shown). The fuel tank may be of any shape and is typically made of sheet aluminum although glass fibre reinforced plastic or other materials could also be utilized. The tank is conventional and therefore is not described further.

The tank is provided with a conventional fuel level sensor 14. The sensor includes a mounting flange 18 having a plurality of circumferentially spaced-apart apertures 15 thereon. A bar 26 extends perpendicularly from the flange 18 into the tank 2 through fuel sensor aperture 12 in the tank. There is a rod 24 hingedly mounted on the end of bar 26 which is provided with a float 25 for measuring the level of fuel in the tank. Sensor 14 is conventional and therefore is not described in more detail.

There is a plurality of circumferentially spaced-apart apertures 11 in the tank 2 extending about the aperture 12 which match the apertures 15 in flange 18. The sensor is normally mounted on the tank by means of bolts which extend through the circumferentially spaced-apart apertures in the flange of the sensor, the tank and corresponding apertures 13 in a resilient gasket 10 fitted between the flange and the tank. The gasket is partially broken away in FIG. 1.

The assembly shown in the drawing differs from the prior art by including an annular fuel tank fitting 16 which allows fuel to be withdrawn through the fuel sensor aperture 12 without interfering with operation of the sensor 14 itself. The fitting includes an annular body 17 which has a flat top 19 and a similar flat bottom 21.

The body has circumferentially spaced-apart apertures 30 corresponding to the apertures in the flange 18 and in the tank 2. These apertures extend from the top of the fitting to the bottom thereof. The apertures 30 are larger than the apertures 15 and 11 in the flange and tank respectively for a purpose described below.

Figure 2:
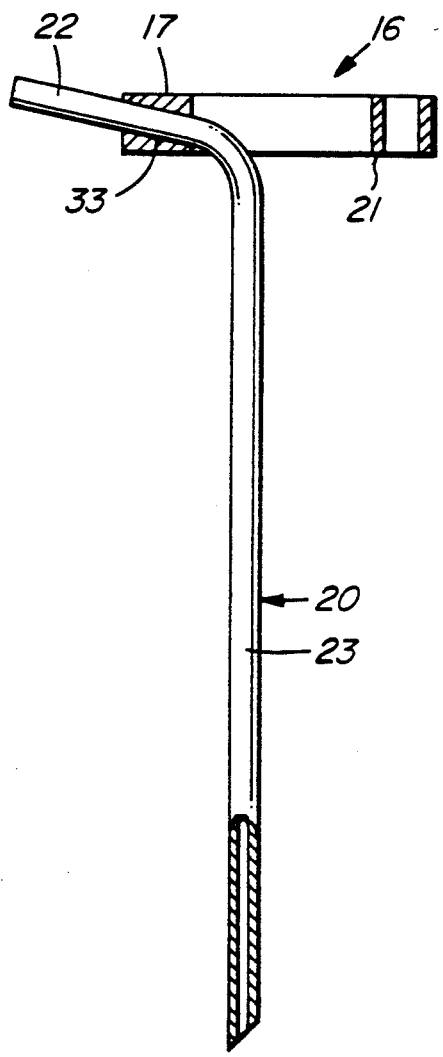
FIG. 2 is a side elevation, partly in section, of the annular fuel tank fitting of the assembly of FIG. 1.
Figure 3:
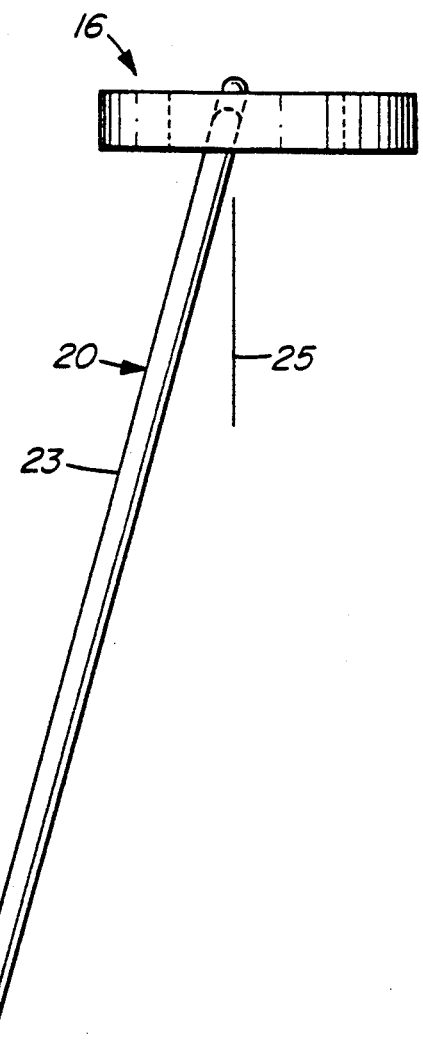
FIG. 3 is a front elevation thereof.

There is a fuel tube 20, which may be of steel tubing or other materials, which has two portions 22 and 23, the latter shown only in FIGS. 2 and 3. Portion 22 extends generally radially through one side of the annular member 16 to the opening 8 at the centre thereof. The fuel tube has a second portion 23 which extends generally perpendicularly away from the bottom 21 of the annular member and is connected at the top to the inner end of portion 22.

Fuel tube 20 is accordingly generally L-shaped, as seen best in FIG. 2, with portion 23 generally perpendicular to portion 22. However, portion 23 is angled slightly outwards with respect to a perpendicular axis 25 through the center of aperture 12 in the tank as seen in FIG. 3. This angling outwards prevents interference between the fuel line and the sensor 14. This is aided by the fuel line being offset from the center of fitting 16 as seen in FIG. 2. In addition, as seen in FIG. 2, portion 22 is sloped downwards towards body 17. This permits the L-shaped fuel line to be inserted into aperture 33 of body 17. Portion 22 is also angled upwardly away from body 17 to allow clearance between the fuel and the tank for a clamp 40 shown in FIG. 1.

The assembly includes a plurality of studs 28, five in this example, used to connect the flange 18 of the sensor to the tank with fitting 16 secured therebetween. These studs are used for ease of installation. The angular spacing of the circumferentially spaced-apart apertures in the flange 18, the fitting 16 and the tank is not even, so the flange and the fitting must be rotated to one particular position for installation. It is difficult to ensure this with bolts because the first few bolts may fit and the mistake is only found upon fitting an additional bolt. Considerable time is wasted trying to get the various components in the correct rotational positions and fitting the bolts through the correct apertures in the flange 18 and fitting 16 into the threaded apertures in the tank. Therefore, in this preferred embodiment, studs 28 replace the bolts. The studs have a threaded top portion 29, a threaded bottom portion 27 and a hexagonal middle portion 31. The treaded bottom portions 27 terminate a distance below the hexagonal portions so the gasket 10 is not over-compressed when the studs are tightened in apertures 11 of the tank.

Upon installation, the bottom portions 27 of the studs are first inserted through apertures 13 in gasket 10 which are smaller than the diameter of the threaded portions of the studs so the studs are retained in the gasket as an assembly which facilitates installation. The studs are then screwed into apertures 11 and are then tightened by a wrench fitted to the hexagonal middle portions 31.

As mentioned above, the apertures 30 in fitting 16 are larger than the apertures in the tank and in the flange 18 of the sensor. This allows the fitting 16 to fit over the hexagonal portions of the studs. Gasket 32, which is similar to gasket 10, is then fitted over the fitting 16. Finally, the bar 26 of the sensor 14 is fitted through aperture 12 and the apertures 15 in the flange 18 are fitted over the top portions 29 of the studs. A plurality of nuts 34, each equipped with a washer 35, are threaded onto the top portions 29 of the studs and tightened to sealingly secure the fitting 16 between the flange 18 of sensor 14 and the tank 2.

Clamps 40 and 42 are used to secure a flexible tube 44 to fuel tube 20 and to a second fuel tube 46 which extends to the fuel pump of the diesel engine heater.

In a alternative embodiment the apertures 30 in fitting 16 could be slotted, in other words circumferentially elongated, instead of being circular in section. This allows the fitting 16 to be fitted at a number of different rotational positions over the studs despite the irregular angular spacing of the apertures 11 on the tank.

It will be understood by someone skilled in the art that many of the details described above are by way of example only and are not meant to limit the scope of the invention which includes many variations within the scope of the following claims.

What is claimed is:

1. A fuel tank fitting for withdrawing fuel through a fuel sensor aperture in a fuel tank, the fitting comprising:

an annular member having a top, a bottom, a central aperture and a plurality of fastener apertures spaced-apart circumferentially thereabout which extend from the top to the bottom thereof; and a fuel line having a first portion extending generally radially through the annular member to the central aperture thereof and a second portion connected to the first portion and extending generally perpendicularly from the bottom of the annular member, the second portion of the fuel line being straight and being angled away from a perpendicular axis of the annular member extending through the center of the central aperture.

2. A fuel tank assembly, comprising:

a fuel tank having a fuel sensor aperture;

a fuel level sensor extending into the tank through the aperture and having a flange covering the aperture;

a fuel line fitting having an annular body between the tank and the flange of the fuel level sensor and a fuel line having a first portion extending generally radially through one side of the annular body and a second portion extending into the fuel tank through the fuel sensor aperture; and means for connecting the fuel level sensor and the fuel line fitting to the tank.

3. A fuel tank assembly as claimed in claim 2, wherein the flange, the body and the fuel tank have a plurality of aligned, circumferentially spaced-apart apertures, the means for connecting including threaded connectors extending through the spaced-apart apertures.

4. A fuel tank assembly as claimed in claim 3, wherein the spaced-apart apertures in the tank are threaded, the threaded connectors including studs threadedly received in the spaced-apart apertures in the tank and nuts fitted on the studs outside the flange of the fuel level sensor.

5. A fuel tank assembly as claimed in claim 4, wherein the studs have hexagonal portions which extend through the spaced-apart apertures in the fuel line fitting and threaded portions extending through the spaced-apart apertures in the flange.

6. A fuel tank assembly as claimed in claim 2, wherein the second portion of the fuel line is generally perpendicular to the first portion.

7. A fuel tank assembly as claimed in claim 2, wherein the fuel line is generally L-shaped.

8. A fuel tank assembly as claimed in claim 2, wherein the second portion of the fuel line is straight and is angled away from a perpendicular axis of the annular body extending through the center thereof.

9. A fuel tank assembly as claimed in claim 5, wherein annular gaskets are fitted between the tank and the fuel line fitting and between the fuel line fitting and the flange.

10. A fuel tank and fuel line assembly, comprising:

a fuel tank having a fuel sensor aperture with a plurality of threaded fastener apertures spaced-apart circumferentially thereabout;

a first gasket on the tank extending about the sensor aperture and having fastener apertures aligned with the fastener apertures of the tank;

a plurality of studs, each having a threaded bottom portion threadedly received in one of the fastener apertures of the first gasket and the tank, a threaded top portion, and a hexagonal center portion between the top and bottom portions;

a fuel line fitting having an annular body on the first gasket, the annular body having a central aperture extending about the fuel sensor aperture of the tank and having a plurality of circumferentially spaced-apart fastener apertures fitted over the hexagonal portions of the studs, and a fuel tube having a first portion extending generally radially through one side of the annular body to the central aperture thereof but being eccentric with respect to the central aperture of the body and sloping towards the tank in the direction of the central aperture of the body, and a second portion extending generally perpendicularly from the first portion into the tank through the fuel sensor aperture but being angled away from the center of the fuel sensor aperture in the direction towards the tank;

a second gasket on the fitting extending about the annular body and having fastener apertures fitted over the top portions of the studs;

a fuel sensor having a mounting flange fitted over the second gasket, having a plurality of circumferentially spaced-apart fastener apertures fitted over the top portions of the studs, a rod connected hingedly thereto and extending into the tank and a float mounted on the rod; and a plurality of nuts threadedly received on the top portions of the studs exterior to the flange of the fuel sensor.

* * * * *